May 20, 1947.  V. R. TRABUCCO  2,420,847
VEHICLE AXLE MOUNTING
Filed June 15, 1945  3 Sheets-Sheet 1

INVENTOR.
Vincent R. Trabucco
BY
ATTYS.

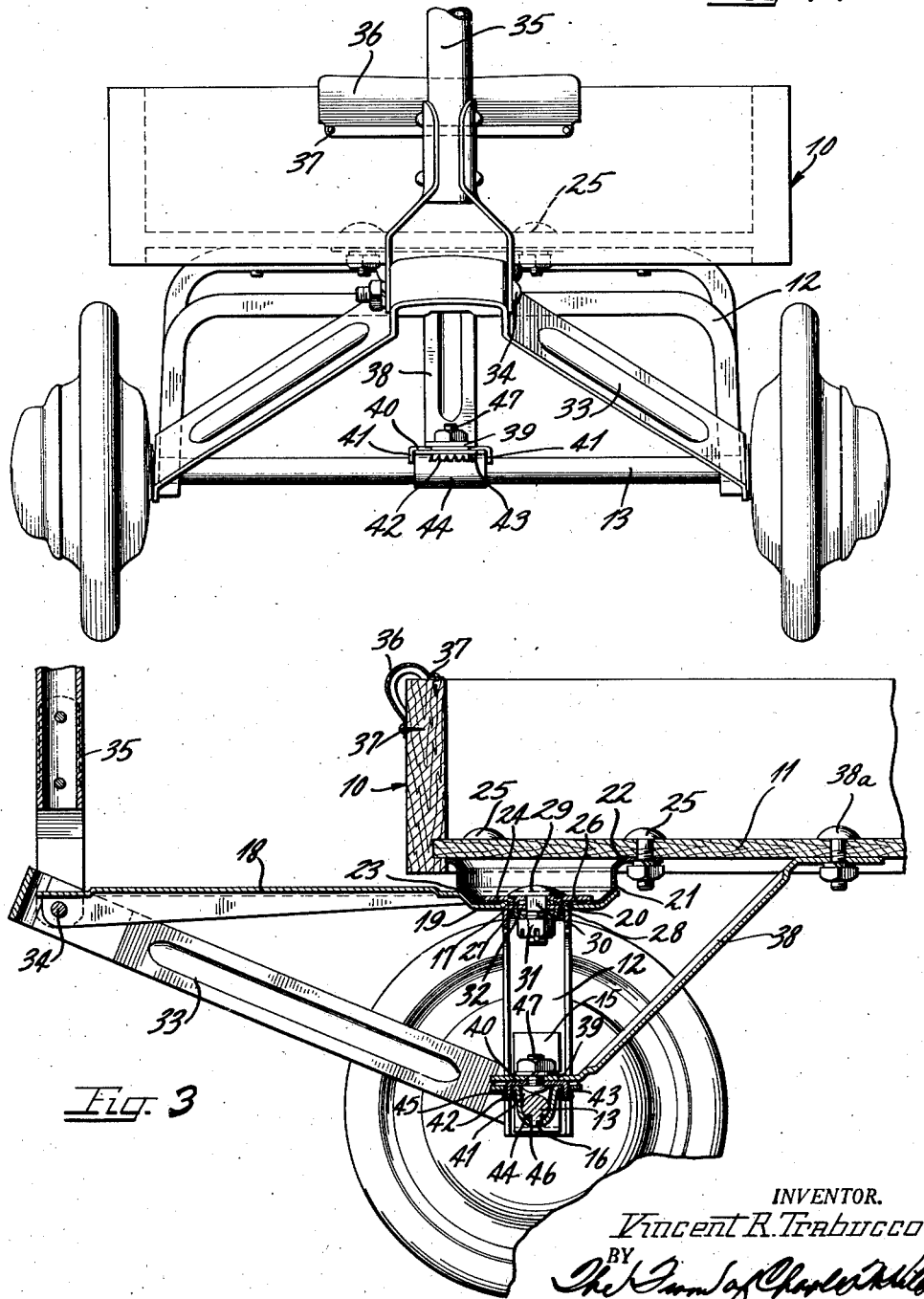

May 20, 1947. V. R. TRABUCCO 2,420,847
VEHICLE AXLE MOUNTING
Filed June 15, 1945 3 Sheets-Sheet 3
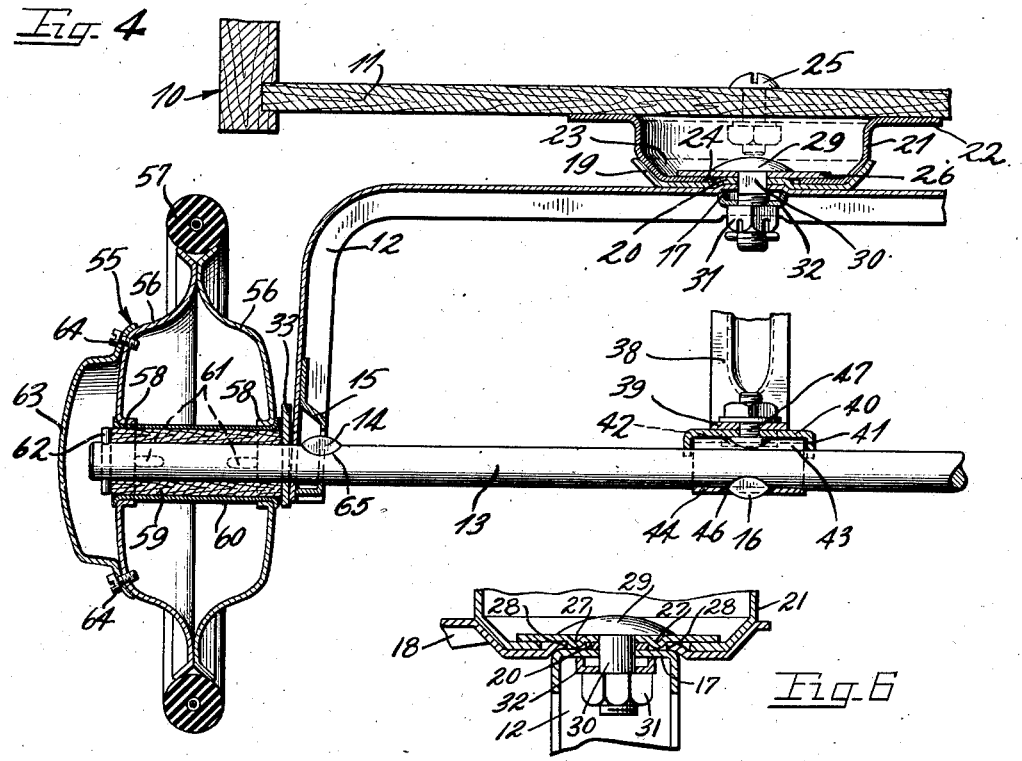
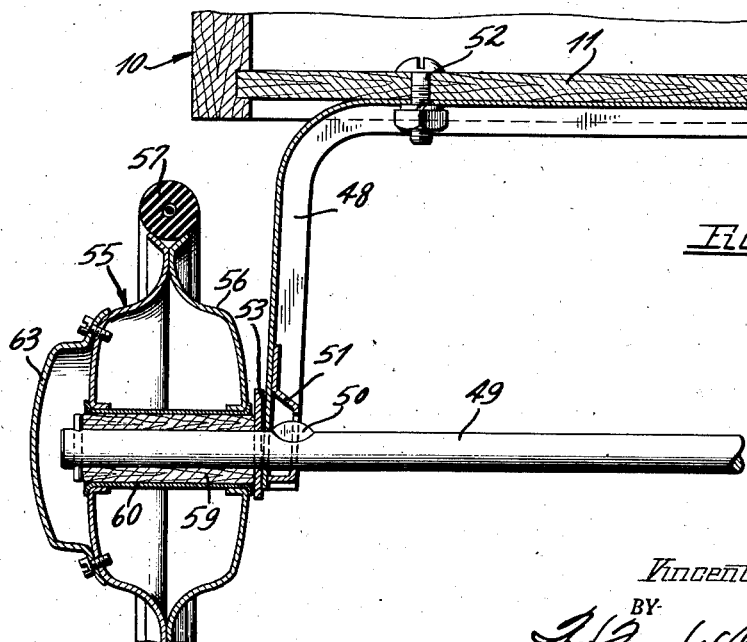
INVENTOR.
Vincent R. Trabucco
BY
ATTYS.

Patented May 20, 1947

2,420,847

UNITED STATES PATENT OFFICE 2,420,847

VEHICLE AXLE MOUNTING

Vincent R. Trabucco, Steger, Ill., assignor to Steger Products Manufacturing Corporation, Steger, Ill., a corporation of Illinois Application June 15, 1945, Serial No. 599,715

5 Claims. (Cl. 280—87.01)

This invention relates to a vehicle, and more particularly to a vehicle in which novel means are employed to connect the axles to the body of the vehicle.

It is common in wheeled vehicles to secure the axles, axle trees, or the like, to the body of the vehicle by means of bolsters. In the case of a turning axle, a king bolt or the like extends through the bolster and axle or axle tree to serve as a pivot or swivel for the axle. Such constructions are defective in the weakness resulting from the use of separate parts, often resulting in looseness and wobbling after some use of the vehicle. In the case of a turning axle, the further difficulty is encountered that due to the looseness which may develop between the bolster and the axle or axle tree, stresses may be imposed upon the king bolt sufficient to bend it permanently, so that it cannot perform its function of a pivot. The present invention provides a construction which avoids these difficulties and provides other advantages, such as the provision of opposed members to counteract dislocating forces acting on the axles.

It is an object of this invention to provide a vehicle having novel means for rigidly connecting a wheeled axle or the like to the vehicle body.

It is another object of the invention to provide a swivel construction for a turning axle of a vehicle which substantially prevents deformation of the swivel member which might result in inoperativeness.

A further object of the invention is the provision of a swivel construction for a turning axle of a vehicle in which a plurality of swivel connections are provided having a common axis to permit free pivoting of the axle while permitting bracing of the axle against movement either forwardly or rearwardly relative to the vehicle body.

It is also an object to provide a vehicle having strong, simple means for connecting an axle to the vehicle body including simple interengaging means for preventing rotation of the axle.

An additional object of the invention is the provision of a swivel connecting a turning axle of a vehicle to the vehicle body which resists deformation upon relative movement of the body and axle toward each other.

Other and further objects and advantages of the present invention will be apparent to those skilled in the art from the following description and appended drawings.

In the drawings:

Figure 2 is a front elevational view of the vehicle shown in Figure 1;

Figure 3 is a fragmentary sectional view taken along the line III—III of Figure 1;

Figure 4 is a fragmentary sectional view taken along the line IV—IV of Figure 1; and Figure 5 is a fragmentary sectional view taken along the line V—V of Figure 1.

Figure 6 is an enlarged scale view of the portion of Figure 3 showing the swivel assembly.

Figure 1:
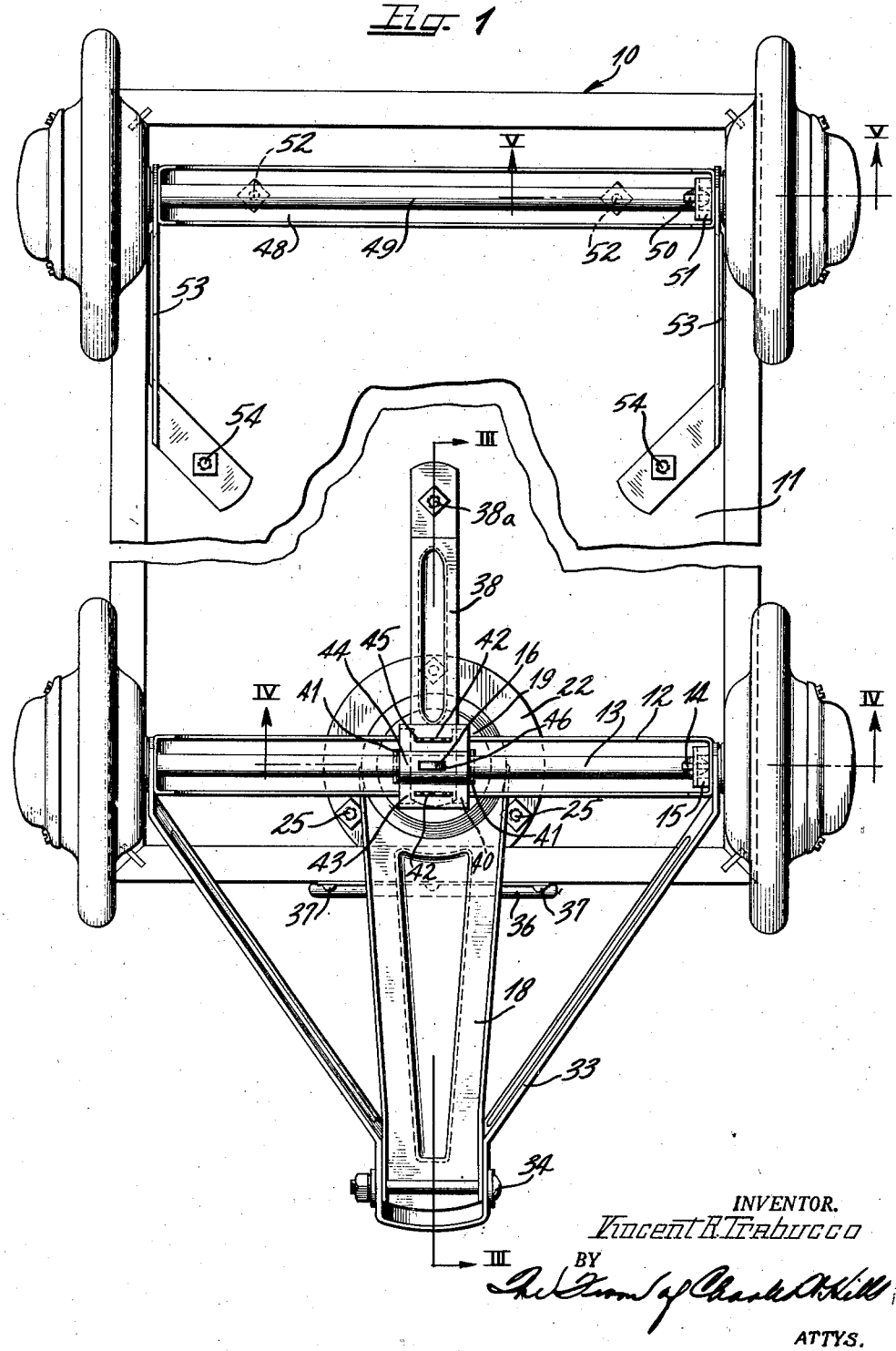
Figure 1 is a broken bottom view of a vehicle embodying my invention.

The invention is illustrated as applied to a child's wagon, but it will be understood that the invention is not limited to application to such vehicles, nor even to wheeled vehicles.

The vehicle 10 may have a body of any desired type with a bottom 11 to which the axles are secured. A front bolster frame 12 which is generally U-shaped and may be of channeled cross section for greater strength carries the front or turning axle 13, the ends of which project through suitable apertures in the legs of the bolster frame. Near one end the axle 13 is provided with a feather key 14 or the like which engages in a suitable slot 65 forming part of an axle aperture in a keyway plate 15 which may be suitably spot welded or otherwise secured to the bolster frame 12. The axle is thus held against rotation. At the center of the axle 13 a key 16 is provided for a purpose later explained. The center of the connecting portion of the bolster frame 12 is dished to provide a circular projection 17 with a square central aperture therein.

A tongue 18 is provided to project forwardly of the body having a circular depression 19 in the rear portion thereof with a central aperture corresponding in size and shape to that of the projection 17 in the bolster frame. Concentric with the portion 19 and the aperture therein is a raised portion 20 receiving the projection 17 in nested relation. A generally annular swivel housing 21 is provided having a securing flange 22 and a cupped portion 23 in the bottom of which is a circular aperture 24 somewhat larger than the circular raised portion 20 of the tongue 18. The cupped portion 23 is of a size and shape to nest in the depressed portion 19 of the tongue, with the portion 20 centered in the aperture 24. The height of the raised portion 20 is such that the upper surface thereof lies in substantially the same plane as the upper surface of the bottom of the swivel housing 21. The housing 21 is secured to the bottom 11 of the vehicle by bolts 25 or the like extending through the flange 22. A swivel washer 26 larger than the aperture 24 and having a central aperture corresponding in size and shape to the apertures in the portions 17 and 20 is disposed in the housing 21 engaging the bottom thereof and the upper surface of the raised portion 20. The washer 26 may have a plurality of projections 27 engaged in corresponding apertures 28 in the dished portion 20 of the tongue. A step bolt 29 has the squared portion 30 thereof extending through the squared apertures of the washer 26, portion 20, and projection 17 to hold the washer, tongue and bolster frame against relative rotation. A suitable nut, such as the slotted nut 31, cooperates with the bolt 29 to hold the members properly secured together. A suitable washer such as the dished washer 32 may be interposed between the nut and the projection 17 of the bolster frame.

The construction just described provides a swivel mounting of the axle 13 on the body of the vehicle which is simple in construction, readily assembled and disassembled, light, and strong. The swivel resists deformation or distortion both because the shape and material of the parts permits slight resilient yielding in the event the axle is urged toward the vehicle body, and because the relatively large surface areas of the swivel washer, housing, depressed tongue portion, and bolster frame resists any oscillation of the bolster frame and presents no fulcrum about which swinging might readily take place. The nested relationship of the housing 21 and the depressed portion 19 of the tongue, together with the engagement of the raised portion 20 in the aperture 24 of the housing, maintains the various elements of the swivel connection in concentric relation. The square portion 30 of the bolt 29 assures that the three movable members will rotate together, and will not rotate relative to each other. Although the apertures in the movable members have been described as square, it will be obvious that they might be of any desired noncircular shape, and the nut 29 might have a portion corresponding to the shape of the apertures instead of having the squared portion 30. The projections 27 of the swivel washer 26 and the apertures 28 in the dished portion 20 of the tongue 18 serve to additionally assure the fixed corotational relation between the washer and the tongue.

A yoke 33 extends forwardly and upwardly from the axle 13, with its ends secured to the axle by any suitable means, such as apertures through which the axle ends project. The central bent portion of the yoke is secured to the forward portion of the tongue 18 by a bolt 34 or the like, the axle, bolster frame, tongue, and yoke being thus held in rigid relation relative to each other. A handle 35 is pivoted to the central bent portion of the yoke, and the bolt 34 may conveniently be utilized for this purpose as well as to hold the tongue and yoke in secured relation. The handle 35 may at times engage against the forward portion or front wall of the vehicle body and to protect the body from wear a guard 36 may be provided, preferably of relatively rigid material. As best shown in Figures 2 and 3, the guard is shown as of curved cross-section with one edge secured to the top of the vehicle front wall and the other edge secured to the front surface of the wall by screws 37 or the like. The guard 36 thus projects somewhat above the front wall of the body to prevent contact of the handle 35 on the body. The guard preferably has a somewhat concave upper surface, as indicated in Figure 2, to facilitate steering movements of the handle when it is in contact with the guard.

The axle 13 is provided with a support against forces tending to urge it into closer proximity to the vehicle body than is provided by its securement through the bolster frame 12 and the swivel connection previously described, in addition to the support provided by the swivel construction including the bolster frame 12, yoke 33, and tongue 18. A bracket 38 has one end secured to the bottom 11 of the body rearwardly of the axle 13 by a bolt 38a or the like, and has its other end secured to the axle at the center thereof. The securement of the bracket and axle is through a swivel connection to permit turning of the axle for steering of the vehicle and similar purposes. A flat portion 39 is provided at the forward end of the bracket 38 extending above the axle 13 and having a bolt aperture therein. A plate 40 is disposed in surface contact with the portion 39 and has a bolt aperture registering with the aperture of the portion 39. At each end the plate 40 is bent toward the axle to provide a pair of flanges 41, the ends of which are arcuately concave to bear on the axle 13. At the front and rear side of the plate 40, flanges 42 are provided bent in the general direction of the axle. A plate 43 having a channeled central portion 44 extending around the axle in diametrally opposed relation to the plate 40 is engaged against the plate 40. The plate 43 has a slot 45 on either side of the channeled portion 44 through which the flanges 42 of the plate 40 may extend in order to secure the plates 40 and 43 together. It will be understood that the flanges 42 may be swaged, bent, or otherwise deformed or distorted after assembly of the plates to prevent separation thereof. An aperture 46 is provided in the channeled portion 44 through which the key 16 on the axle 13 extends to hold the parts against relative rotation. A bolt 47 or the like extends through the apertures in the bracket portion 39 and plate 40 to hold them in secured relation and to serve as a pivot. The bolt 47 is in alignment with the step bolt 29 of the upper swivel connection, so that the swivel connection between the axle and the bracket 38 and the swivel connection between the bolster frame 12 and tongue 18 and the swivel housing 21 have a common axis.

The bracket 38 holds the axle against movement thereof rearwardly and upwardly relative to the vehicle body, and further serves to resist movement of the axle upwardly and forwardly relative to the body. The bracket 38 is in opposed relation to the tongue 18 and the yoke 33, and because of its connection to the center of the axle 13 it opposes any stresses transmitted by the tongue 18 and the yoke 33 which might tend to cause oscillation of the axle and bolster frame on the upper swivel connection regardless of the position or angle to which the tongue or yoke, and therefore the axle and bolster frame, may be turned. As will be evident from the description and from the illustration in the drawings, the construction and arrangement of the tongue 18 and yoke 33, bolster frame 12, axle 13 and bracket 38 provide substantially a trussed structure which serves to prevent any substantial movement of the axle relative to the body except the swiveling or turning movement provided for by the upper and lower swivel connections.

A rear bolster frame 48 is provided generally similar to the bolster frame 12, but having the legs thereof somewhat longer than those of the frame 12, and having no projection on the connection portion thereof such as is provided at 17 in the front bolster frame. The rear axle 49, which is substantially similar to the front axle 13, with the exception that the central key 16 is omitted, is secured in the legs of the bolster frame 48 in the same manner as described in connection with the front axle. A key 50 is provided near one end of the axle 49 which engages in a suitable aperture or slot in a keyway plate 51 which is secured to one leg of the bolster frame by welding or other means. The connecting portion of the bolster frame is secured to the bottom 11 of the vehicle body by a plurality of bolts 52 or by other suitable means. A plurality of brackets 53 are provided each having one end apertured so that the axle 49 may project therethrough and having the other end bent to lie against the bottom 11 of the vehicle body for securement thereto by bolts 54 or the like. The rear axle is thus held in rigid spaced relation to the vehicle body.

The end portions of the axles projecting axially outwardly of the bolster frames carry wheels 55 rotatable thereon, which may be of any desired construction. As shown, each wheel is formed of a pair of discs 56 having a central bulged portion providing a hollow space within the wheel and a turned edge, the discs being connected in any suitable manner intermediate the edge and the bulged portion. The turned edges of the discs 56 provide an annular cross-sectionally troughshaped rim portion in which an annular tire of rubber or similar material may be seated. Each disc 56 has a central circular aperture defined by an axially inwardly extending flange 58, and a bearing extends through the hollow portion of the wheel and through the apertures defined by the flanges 58.

The bearing comprises a tubular member 59, which may be of hard wood such as maple impregnated with oil, and a bearing sleeve 60 in which the tubular member 59 has a press fit. The sleeve may have projections 61 to bite into the tubular member 59 and prevent relative rotation therebetween, and if desired the sleeve may be slit. The ends of the sleeve 60 are bent or peened about the apertures in the discs 56 to hold the bearing in fixed relation to the wheel. The end portion of the axle extends through the tubular member 59 and projects slightly axially outwardly thereof. Suitable means may be employed to prevent the wheel moving off the axle, such as a cotter pin 62 disposed in a suitable bore through the axle. A hub cap 63 of any desired configuration may be secured to the wheel to conceal the bearing at the end of the axle. The securement of the hub cap on the wheel may be by any suitable means, such as screws 64. If the hub cap and disc 56 are formed of sheet metal, the screws 64 may conveniently be self-tapping sheet metal screws.

Although the axles 13 and 49 have been illustrated and described as of circular cross-section and held against rotation by keys or the like, it will be understood that the axles might be of non-circular cross-section except at the end portions thereof on which the wheels are rotatably mounted, and the keys and associated means for preventing rotation of the axles might then be omitted. It will also be understood that if desired the axles might be round, but have the wheels rigidly mounted thereon, the axles being free to rotate and suitable bearings being provided at the points of engagement thereof with the bolster frames. It will be clear that the swivel connection between the bracket 38 and axle 13 will operate in substantially the same way whether the axle rotates or not.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A swivel construction for a vehicle comprising a circular cupped swivel housing having its rim secured to the vehicle body and having an enlarged aperture in the bottom thereof, an axle support having a smaller non-circular aperture concentric with the housing aperture, a tongue having a circular dished portion in nested relation with said swivel housing disposed between said housing and the axle support and having a non-circular aperture registering with the aperture of said axle support, a swivel washer in said housing engaging the bottom thereof and having a non-circular aperture registering with said apertures of said axle support and tongue, said tongue and washer having cooperating projections and depressions to secure said tongue and washer for co-rotation, and a connecting member of conforming non-circular cross section extending through said non-circular apertures to secure said swivel washer, tongue, and axle support in fixed co-rotating relation but extending freely through said housing aperture to provide for relative swiveling movement between said housing and said washer, tongue and axle support.

2. A pivot construction for a vehicle comprising a bracket secured to the vehicle body and having a flat portion with an aperture therein, a first swivel plate in bearing relation with said flat portion having an aperture registering with said bracket aperture, a pin member extending through said apertures to secure said flat portion and first plate in swiveling relation, first spaced flanges extending from said first plate adapted to bear on an axle, second spaced flanges extending from said plate, a second swivel plate having apertures receiving said second flanges and a channeled central portion between said apertures, said second flanges being deformed upon assembly to lock said first and second plates together, an axle extending through said channeled portion and engaging said first flanges, and a bolster frame supporting said axle on the vehicle body.

3. In a pivotal mounting, a cup-shaped member having a plane bottom wall defining a circular opening; a second member contoured to conform to and receive said cup-shaped member and having an upwardly dished circular portion extending into said circular opening to form a continuation of said plane bottom wall; a support for said second member fixedly associated therewith; a washer bearing against the upper plane surfaces of said bottom wall and upwardly dished circular portion; said washer, upwardly dished circular portion and support having aligned non-circular central openings; and means extending through said aligned non-circular openings to hold said washer, cup-shaped member, second member and support in assembled relationship with said cup-shaped member free to turn relative to said washer and second member.

4. In a pivotal mounting, a cup-shaped member formed of a metal stamping having a plane bottom wall defining a circular opening; a second member formed of a metal stamping contoured to conform to and receive said cup-shaped member and having an upwardly dished circular portion extending into said circular opening to form a continuation of said plane bottom wall; a support for said second member having elements interengaging with said second member to be fixedly associated therewith; a washer bearing against the upper plane surfaces of said bottom wall and upwardly dished circular portion; said washer, upwardly dished circular portion and support having aligned non-circular central openings; and means including a bolt having a non-circular shank conforming closely to and extending through said aligned non-circular openings to hold said washer, cup-shaped member, second member and support in assembled relationship with said cup-shaped member free to turn relative to said washer and second member.

5. A swivel construction for a vehicle comprising a circular cupped swivel housing having a rim adapted to be secured to the vehicle body and defining an enlarged aperture in the bottom thereof, a tongue having a circular dished portion contoured to receive said swivel housing in nested relation and having an upwardly dished circular portion extending into said enlarged aperture to form a continuation of the bottom wall of said housing, an axle support having an upwardly dished circular portion received in the under side of said upwardly dished circular portion of said tongue in nested relation, said axle support and said tongue each having a smaller non-circular aperture concentric with the housing aperture, a swivel washer in said housing bearing against the top surfaces of said upwardly dished portion of said tongue and the bottom surface of said housing, said swivel washer also having a non-circular aperture registering with said apertures of said axle support and tongue, and a connecting member of conforming, non-circular cross section extending through said non-circular apertures to secure said swivel washer, tongue and axle support in fixed co-rotating relation but extending freely through said housing aperture to provide for relative swivelling movement between said housing and said washer, tongue and axle support.

VINCENT R. TRABUCCO.

REFERENCES CITED

The following references are of record in the file of this patent:

UNITED STATES PATENTS

| Number | Name | Date |
| --- | --- | --- |
| 2,015,726 | Pasin | Oct. 1, 1935 |
| 1,854,337 | Kraeft | Apr. 19, 1932 |
| 1,589,168 | Hubbard | June 15, 1926 |